United States Patent [19]

Williams

[11] Patent Number: 4,700,506

[45] Date of Patent: Oct. 20, 1987

[54] FLEA TRAP

[75] Inventor: Clarence O. Williams, Rocky Mount, N.C.

[73] Assignee: Happy Jack, Inc., Snow Hill, N.C.; a part interest

[21] Appl. No.: 769,260

[22] Filed: Aug. 26, 1985

[51] Int. Cl.⁴ .............................................. A01M 1/04
[52] U.S. Cl. ..................................................... 43/113
[58] Field of Search ....................... 43/113, 132.1, 114

[56] References Cited

U.S. PATENT DOCUMENTS

| | | | |
|---|---|---|---|
| 1,019,410 | 3/1912 | Baker | 43/113 |
| 1,820,813 | 8/1931 | Loomis | 43/113 |
| 2,384,930 | 9/1945 | Kendrick | 43/113 |
| 3,465,468 | 9/1969 | Takamoto | 43/113 |
| 3,513,585 | 5/1970 | Ross | 43/113 |
| 4,086,721 | 5/1978 | Deas | 43/113 |
| 4,157,629 | 6/1979 | Parks | 43/113 |
| 4,366,643 | 1/1983 | Boaz | 43/113 |

Primary Examiner—M. Jordan
Attorney, Agent, or Firm—B. B. Olive

[57] ABSTRACT

A flea trap comprises a flat, shallow rectangular pan adapted for resting on the floor, flypaper or other sticky substance confined in the pan for trapping the fleas, a rectangular light reflecting cover, wire formed leg members adapted to resiliently grasp selected edges of the pan and support the cover over the pan, and an electrically energized green light source suspended from the light reflecting underside of the cover so as to lure fleas to the pan by means of both reflected green light and directly radiated green light.

5 Claims, 4 Drawing Figures

FLEA TRAP

CROSS REFERENCE TO RELATED APPLICATION

The subject matter of the present invention relates to and represents an improvement on the flea trap described in co-pending patent application Ser. No. 645,415 filed Aug. 29, 1984, by Steve Justice and entitled "Insect Trap" now U.S. Pat. No. 4,566,220.

TECHNICAL FIELD

The present invention relates to insect traps and particularly to a trap for luring and exterminating fleas.

BACKGROUND ART

U.S. Pat. No. 4,157,629 teaches use of a specific invisible light source, namely, UV radiation, for attracting flying insects. U.S. Pat. No. 3,513,585 teaches a trap for trapping flying insects in which upwardly reflected light as well as upwardly radiated light from a visible flourescent lamp source is used to attract flying insects. Fleas, unlike flying insects, move by leaping or hopping from position to position by reason of being wingless and non-flying. A white electric light suspended over a pan of water has been used but has not proven effective for trapping large numbers of fleas. Because of the nature of fleas, a trap for trapping wingless, non-flying fleas must take into account many considerations that do not effect traps for trapping flying insects. Thus, a flea trap must be accessible to the fleas that hop from a source such as a carpet infested with fleas. A trap which is positioned several feet in the air may be completely suitable for catching flying insects but may be totally unsuited for catching fleas.

Copending patent application Ser. No. 645,415 describes an effective yet simple flea trap upon which the present invention seeks to improve. In the prior copending application Ser. No. 645,415 a green light is used as the light source. The green light source is suspended immediately below a cover having a light reflective surface and the reflected green light as well as the directly radiated green light is directed downwardly to a shallow pan having a sticky substance and over which the light and cover are supported. While the flea trap of copending patent application Ser. No. 645,415 has proven to be commercially successful, it has been found desirable to simplify that construction to enhance the ability to package the trap in a compact package for purposes of shipping, marketing and using the trap. The present invention is thus primarily directed to a flea trap construction having parts which can be shipped disassembled and easily assembled at the site of use.

DISCLOSURE OF INVENTION

In accordance with the present invention, applicant improves on a flea trap of the type comprising a shallow base pan, a sticky liquid or other sticky substance within the shallow base pan, a light reflecting cover positioned and supported over the pan and an electrically energized, preferably green, light source suspended from the bottom of the cover. Fleas attracted to the reflected and directly radiated green light from the green light source jump over the side wall of the shallow pan into the sticky substance which in turn prevents escape and eventual extermination of the fleas. The improvement afforded by the present invention is directed to providing specially wire-formed leg members adapted to be flexed and grasp the pan to support the cover. A separate gridded slide-on hand grill is also provided as an auxiliary optional attachment to prevent pets from coming in contact with the contents of the pan.

BEST MODE FOR CARRYING OUT THE INVENTION

Figure 1:
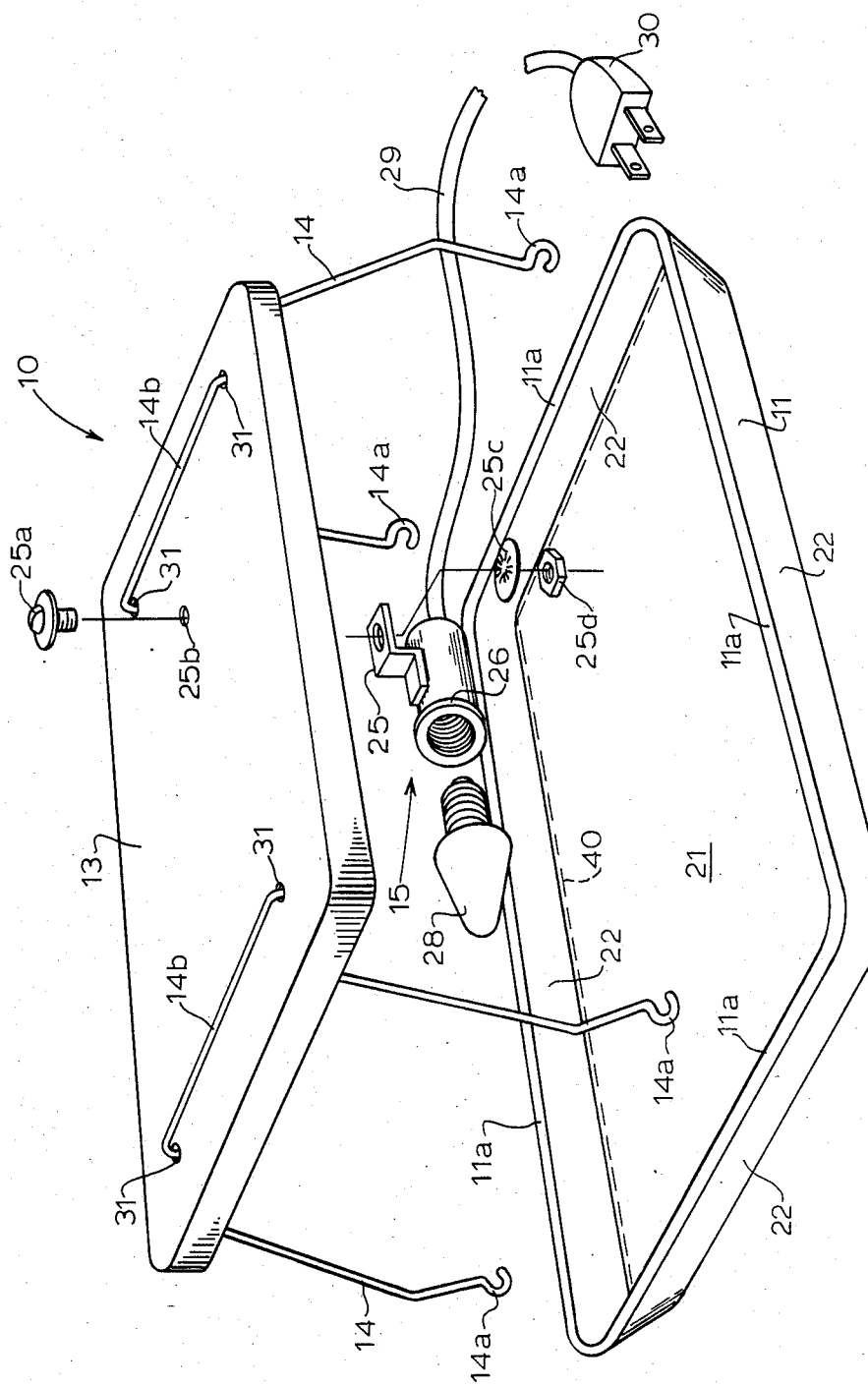
FIG. 1 is an exploded perspective view of the invention flea trap.
Figure 2:
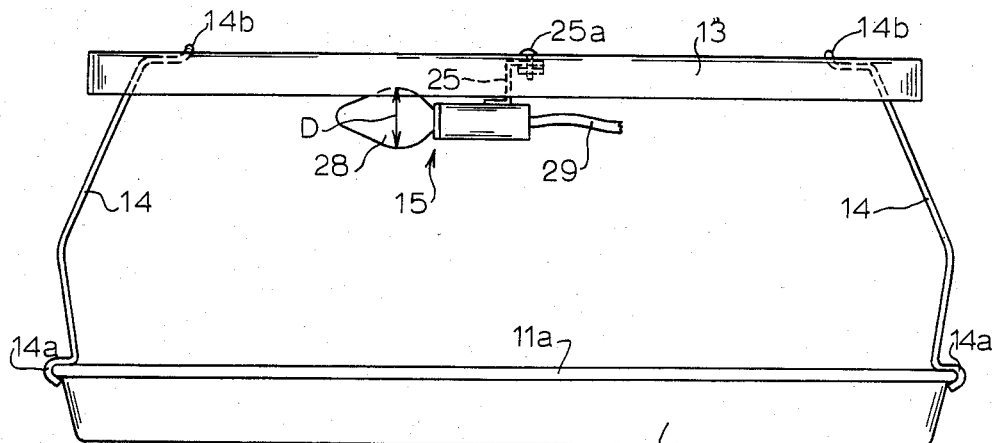
FIG. 2 is a side elevation view of the flea trap of FIG. 1.

Referring to the drawings flea trap 10 in accordance with the invention as illustrated in FIGS. 1-2 comprises a shallow, rectangular aluminum pan 11, a somewhat smaller rectangular aluminum light reflective cover 13 supported in a vertically spaced relation a few inches, e.g., 3 to 6 inches, above pan 11 by specially wire-formed expandable legs 14 which snap-fit to the end sidewalls of pan 11 and to which the present invention is directed. An electrically energized incandescent green light source 15 is secured to the underside of cover 13 so as to utilize the light reflective surface of the underside of cover 13. A 3 to 5 inch space between light 15 and pan 11 has proven effective. Pan 11 has a rim 11a, a flat bottom wall 21 and upstanding side/endwalls 22 which are sufficiently low in height to allow fleas to jump over such walls. In use, trap 10 is supported by pan 11 resting on a flea infested rug or other surface. In one embodiment, the walls 22 were approximately $\frac{3}{4}$ inch high and pan 11 was approximately 11 inches by 7 inches in length and width. Cover 13 was of comparable length and width and light 15 comprised a 120 volt, 1/10 watt green light of the shape illustrated with the bulb portion approximately $1\frac{3}{8}''$ in length and with the diamter D being approximately $\frac{7}{8}''$, a typical Christmas tree light size and shape. A bracket 25 holds light source 26 in place suspended from the underside of cover 13. Bracket 25 is held in place by screw 25a passing through hole 25b in cover 13, lock washer 25c and nut 25d. Cord 25 extends from socket 26 and through plug 30 to a conventional wall outlet such as a baseboard receptacle as a source of electricity. As previously mentioned, the underside of cover 13 is light reflective. Thus, both downwardly reflected green light as well as downwardly-directed radiated green light is transmitted towards pan 11 and outwardly towards the fleas.

Figure 3:
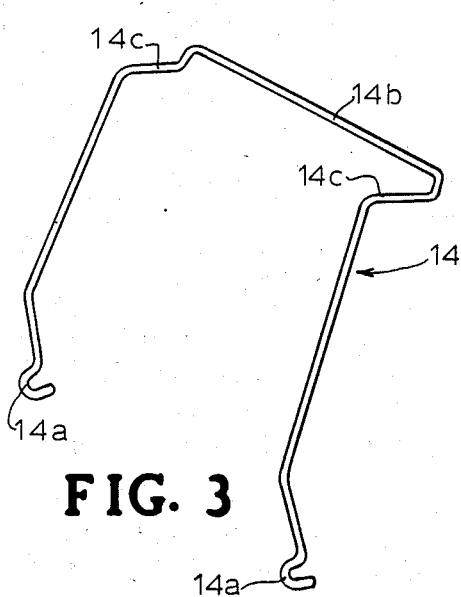
FIG. 3 is a perspective view of one of a pair of expandable leg members employed with the invention flea trap.

Light reflecting cover 13 is supported above pan 11 by wire-formed legs 14 so as to provide open space between cover 13 and pan 11 through which the fleas hop to reach the sticky substance in pan 11. As seen in FIG. 3, legs 14 are formed as bent metal wire members which may be flexed and spread apart to aid in assembly. Top cover 13 has two pair of holes 31 through which the free ends of legs 14 are passed. The free ends of legs 14 are U-shaped as at 14a to fit around rim 11a of pan 11. U-shaped ends 14a are fed through holes 31 until the closed ends 14b of legs 14 are flush with the top surface of cover 13. Arm portions 14c of legs 14 are made to reside flush with the interior reflectorized surface of cover 13. Legs 14 are formed such that they can be bent outwardly from the FIG. 2 position and then released to grab the rim 11a and at opposite ends of pan 11 as illustrated. Flea trap 10 may be shipped in a flat dismantled condition with the parts disassembled and nested and then quickly assembled by the purchaser.

In operation, the basic principal is to lure fleas into pan 11 by means of the light source and it has been discovered through testing, as previously set forth in copending application Ser. No. 645,415 that a reflected green light source works most favorably. A conventional low wattage, green-colored, incandescent bulb of the typical household night-light or Christmas tree light size meets the desired requirements of the invention. Also, the presence of a cover with a reflectorized inside surface supported a few inches over pan 11 has also been discovered to enhance the efficiency of the trap as has use of a pan with low sidewalls for holding the flea trapping means. A sticky landing surface is provided by a sticky liquid or by a sheet of commercially-available sticky flypaper 40 placed in the bottom of pan 11 which rests on the floor of a room, an infested rug or the like making the pan readily accessible to the hopping fleas. The reflected and directly radiated green light lures the fleas to pan 11 which necessitates the fleas jumping over the low sidewalls of pan 11 which they are able to do and through the open space provided between pan 11 and cover 13. As previously mentioned, a thin layer of sticky liquid may be used in pan 11 in place of flypaper 40. The liquid if used is preferably of an oily formula which is non-toxic and adapted for safe use in a home where there are small children and pets. Liquids such as corn oil, peanut oil, Wesson oil, Crisco, baby oil, mineral oil, and castor oil are all effective sticky liquids and have been discovered as non-offensive to the fleas. Whatever sticky substance is selected, it should be sufficiently sticky to adhere to the fleas once contact is made between the flea and the sticky substance.

Figure 4:
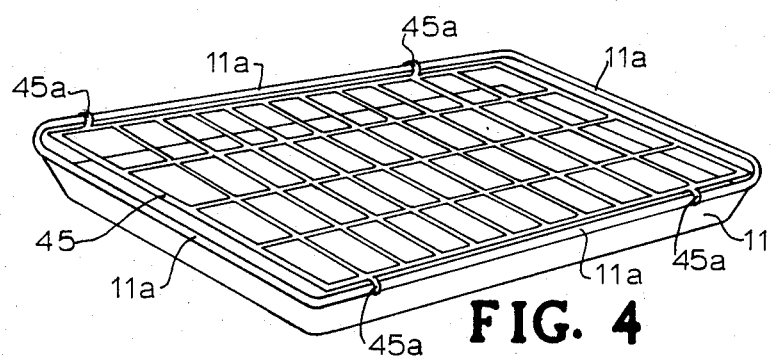
FIG. 4 is a reduced scale perspective view of the base pan and optional grill cover employed with the present invention.

The fleas are attracted to the reflected and directly radiated green light, jump toward the light and into the liquid or flypaper in the bottom of pan 11 and are thus trapped in the pan until they die. Alternatively, as best seen in FIG. 4, a plastic molded grill cover 45 is designed onto pan 11 and has support pieces 45a which grasp rims 11a of pan 11 and prevents animals or small children from playing with the contents of pan 11.

The invention flea trap advantageously lures fleas from carpet and furniture wherein conventional methods of spraying for fleas tends to drive the fleas to other areas. Also, while spraying kills adult fleas, it dissipates and is virtually non-effective for killing of young fleas to come from eggs left in the area. The invention flea trap attracts daily any fleas in the area and over a period of time has been found to effectively eliminate virtually all fleas in that area. While primarily intended to lure and trap fleas it is recognized that other insects may also sometimes be trapped and exterminated by the invention device.

Ease of shipping as a knock-down assembly is uniquely assisted by use of the special wire-formed leg members 14 which can be shipped disassembled from cover 13. At the site of use, the respective leg members 14 can be easily inserted in the respective mounting holdes 31, flexed and located to grasp rim 11a of pan 11 to support cover 13 after which light source 15 is easily assembled as illustrated.

What is claimed is:

1. A trap for catching wingless, non-flying fleas, comprising:
   (a) a shallow pan having and supported by a flat bottom wall enabling said pan to be accessible to a source of fleas to be trapped and having formed edge portions on upstanding side walls thereof;
   (b) a sticky substance disposed in said pan and providing a sticky landing surface above said bottom wall for live fleas to be trapped and killed;
   (c) a cover having light reflective horizontal bottom surface and spaced apart pairs of holes extending through said surface;
   (d) support means comprising a pair of wire-formed leg members, each said wire-formed leg member having a central portion resting against the top surface of said cover and leg portions extending from opposite ends of said central portion downwardly through a selected pair of said holes in said cover, each said leg portion having an intermediate portion formed to rest against the bottom surface of said cover, downwardly extending legs and at the lower ends of each said leg being formed to grasp said shallow pan formed edge such that when said legs are spread apart said intermediate portions bear against the bottom surface of said cover and said lower ends tend to resiliently grasp said shallow pan formed edge and thereby support said cover in vertically-spaced relation over said pan with said light reflective surface opposing the bottom wall of said pan and located to provide open unobstructed space between said cover and pan to permit said fleas to jump through said space into said pan to contact said sticky landing surface; and
   (e) an electrically energized visible light source, said light source being secured to said cover below said light reflective surface thereby generating and exposing to the fleas sought to be trapped both reflected downwardly transmitted light and downwardly and outwardly transmitted directly radiated light mixed with said reflected light from said source.

2. A trap as claimed in claim 1 wherein:
   (a) said shallow pan is rectangular;
   (b) said cover is rectangular;
   (c) said light reflective surface extends between ends of said cover; and
   (d) said wire-formed leg members grasp the said formed edge at the ends of said rectangular shallow pan.

3. A trap as claimed in claim 2 wherein:
   (a) said legs support said cover light reflective surface immediately above said light source; and
   (b) said light source is supported by said cover substantially five inches or less above said sticky landing surface.

4. An improved flea trap comprising: a container portion including a peripheral wall having a lip formed along the upper edge thereof; a cover portion having a pair of openings formed in each end thereof; a pair of U-shaped support members for supporting said cover portion in a spaced relation above said container portion, each U-shaped support member including a pair of legs joined at one end by an interconnecting portion with the opposite end of each leg terminating in a hook portion for engaging said lip of said container, said U-shaped support members further including a shoulder formed in each leg adjacent said interconnecting portion such that when said U-shaped support member is disposed through respective paired openings with said interconnecting portion disposed against the top side of said cover portion and said shoulders disposed adjacent the underside of said cover portions, a binding action is created which therefore tends to pull said hook portion inwardly to firmly engage said lip; attractant light disposed between said container portion and said cover portion; and an adhesive sheet material disposed within said container portion and having an adhesive surface disposed toward said attractant light whereby when said attractant light is illuminated, fleas will jump toward the same, fall into said container portion, and become stuck to the adhesive surface of the entrapment material.

5. The improved flea trap of claim 4 wherein said cover portion is so sized as to form a lid engageable with said container portion and wherein said U-shaped support members can be disengaged from said lip and folded inwardly under said cover portion prior to placing the same into an engaging relationship with said container portion.

* * * * *